Oct. 26, 1971 — W. P. REECE — 3,615,013

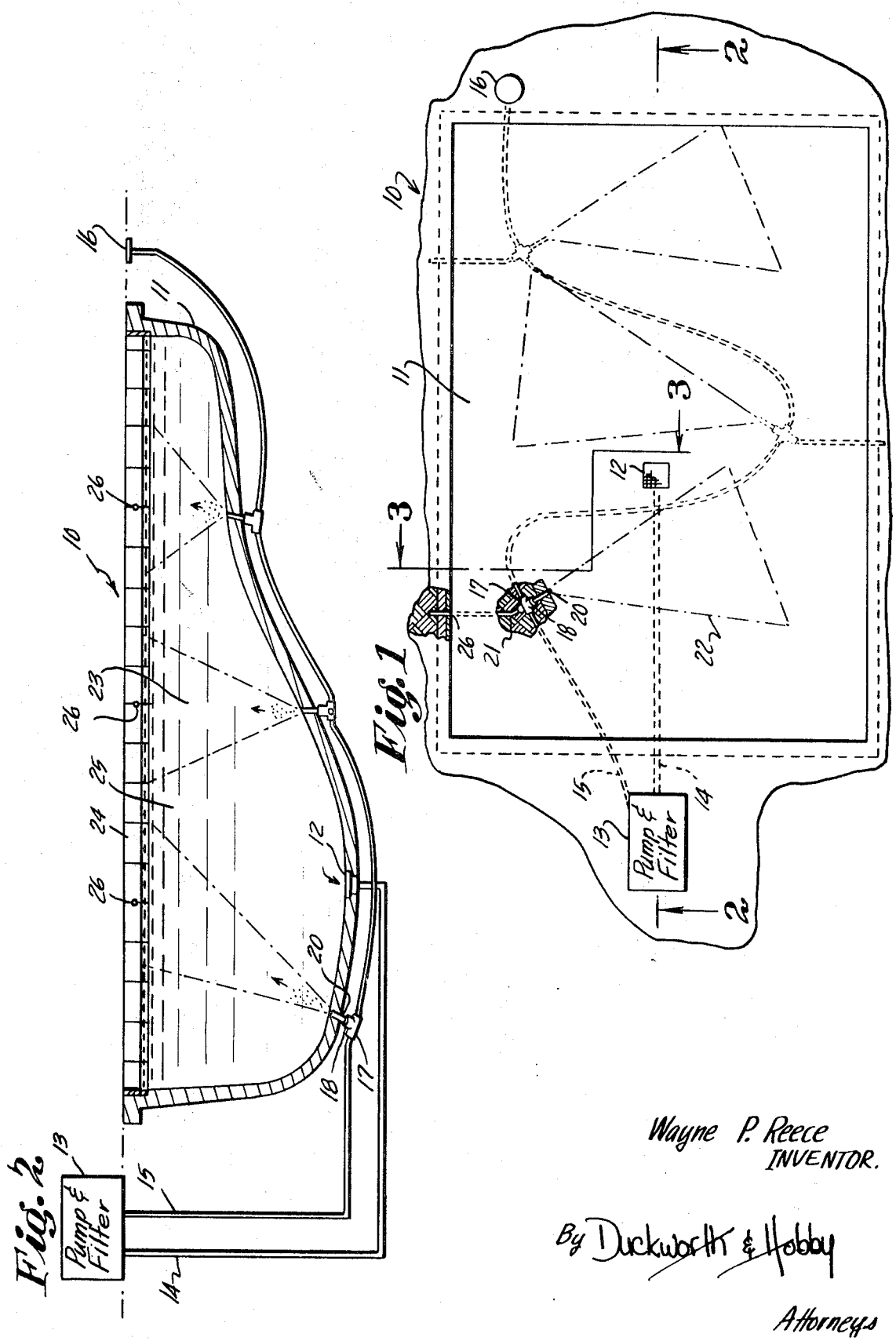

SWIMMING POOL APPARATUS

Filed July 17, 1969 — 2 Sheets-Sheet 2

Wayne P. Reece
INVENTOR

By Duckworth & Hobby
Attorneys

United States Patent Office

3,615,013
Patented Oct. 26, 1971

3,615,013
SWIMMING POOL APPARATUS
Wayne P. Reece, Orlando, Fla., assignor to Tropicana Pools, Inc., Orlando, Fla.
Filed July 17, 1969, Ser. No. 842,514
Int. Cl. E04h 3/20
U.S. Cl. 210—169
2 Claims

ABSTRACT OF THE DISCLOSURE

A swimming pool aerator apparatus for bubbling air into a swimming pool having a water line from the swimming pool filter system leading to one or more aspirator pumps connected to the bottom of a swimming pool for water to pass from the filter system through the aspirator pump into the swimming pool. An air line is connected from above the water level of the swimming pool down to the aspirator pump whereby water passing through the aspirator pump will draw air into admixture therewith which air will bubble through the water in the swimming pool. Several swimming pool aerators are connected in tandem with outputs angled into the pool bottom to provide for aeration of the water and agitation of the silt in the swimming pool, which silt may then be filtered through the filtering system.

BACKGROUND OF THE INVENTION

(1) Field of the invention

The present invention relates to swimming pools and more specifically to swimming pool aerators for bubbling air through the water in a swimming pool for increasing the oxygen content of the water while stirring up silt, and the like, to help maintain a clean pool and provide an improved esthetic appearance of the pool water.

(2) Description of the prior art

In the past it has been the practice in swimming pool aerators to provide a special air pump for pumping air into a swimming pool for purposes of aeration primarily in specialized swimming pools for a pleasing appearance.

It has been common practice in the past to use aeration in the treatment of sewage, and the like, in which the air pump forces air through sewage which is in the process of being treated to increase the oxygen content of the effluent and thus increase the activity of the aerobic bacteria for treating and breaking down the solid constituents of the sewage. These prior art devices have been satisfactory for their particular uses but have required additional and often expensive equipment such as air compressors and motor drives for forcing air through water, and the like. However, these previous devices were not generally suitable for the average home swimming pool in which it is desirable to keep the cost reasonable. These prior art aerators also have not been useful in assisting in cleaning swimming pools by providing agitation of silt, and the like, that settles on the bottom of the pool stirring the silt up into suspension in the water where it is then filtered out of the pool.

Accordingly it is an object of the present invention to provide a simple, economical swimming pool aerator which produces an esthetic condition in the home swimming pool by aerating and increasing the oxygen content of the water, and improving the treatment of the water while reducing maintenance requirements for the swimming pool.

SUMMARY OF THE INVENTION

The present invention provides a swimming pool aerator for bubbling air into a swimming pool in which a water line from the filter pump of the swimming pool filtering system forces water through an aspirator pump, spray jet, or the like, into the bottom of a swimming pool. An air line is connected from above the water level in the side of the swimming pool and runs into the aspirator in a manner whereby water passing through the aspirator will draw air into admixture therewith which air will then bubble through the swimming pool water. A plurality of the swimming pool aerators may be connected in tandem to the water line and placed at angles at the bottom of the swimming pool, whereby the air and water passing into the pool from the aspirator pump will provide a sweeping effect for agitating silt and trash in the swimming pool while producing bubbles which provide an esthetic effect over a large portion of the swimming pool. The water line passing under the swimming pool may desirably pass to the other end of the swimming pool where it is capped or otherwise removably sealed so that the cap may be removed for cleaning the system as desired. The aspirator pump provides a nozzle for the water to pass through with an inter-connecting air line connected to one side of the nozzle in a manner that the pressure created by the passing water will draw air into admixture therewith. By admixture is meant that bubbles of air will be drawn into the water and in which the oxygen content of the water is increased.

BRIEF DESCRIPTION OF THE DRAWINGS

Other objects, features and advantages of this invention will be apparent from a study of the written description and the drawings, in which:

FIG. 1 shows a top plan view of a swimming pool with broken away portions and dashed lines to show one embodiment of the present invention installed therein;

FIG. 2 is a cut-away sectional view taken along line 2—2 of FIG. 1;

DESCRIPTION OF THE PREFERRED EMBODIMENT

Figure 3:
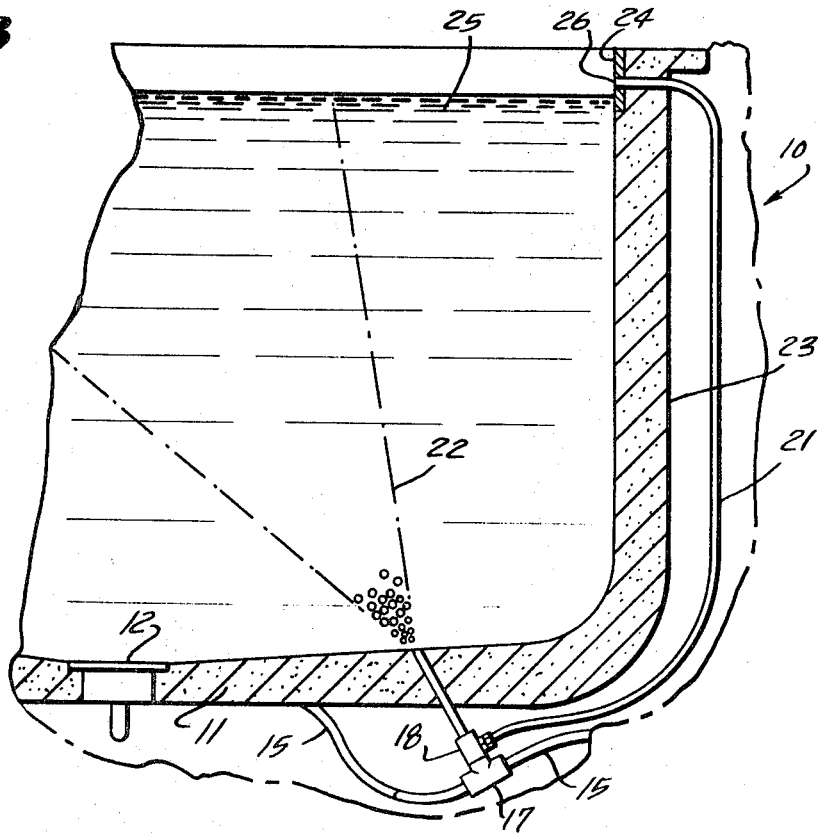
FIG. 3 is a view taken along line 303 of FIG. 1.

Referring now to FIG. 1, there can be seen generally a swimming pool 10 having a bottom 11 and a bottom drain 12; a pump and filter system 13 are indicated as a block and a connecting line 14 is illustrated connected between the drain 12 and the pump 13 in dashed lines to illustrate that it runs beneath the swimming pool which is located in the ground. Another water line 15 is shown leaving the pressure side of the pump 13 and passing snake-like beneath the bottom of the pool 10 and ending in a cap 16 or other removable sealable cover which is located for easy removal for cleaning pipe 15 and other parts of the system as will be described in more detail. Three T-joints 17 are connected into the water line 15, each of which T-joints is connected with an aspirator type pump 18 which pump is in turn connected by a pipe or the like from the aspirator nozzle into the swimming pool by pipe 20. Aspirator pump 18 also has an air line 21 connected thereto for bleeding or drawing air into the aspirator as the water passes therethrough. This air line 21 also extends under the pool and up to the side of the pool where it opens into the side of the pool above the water level of the swimming pool. The inlet pipe 20 entering into the bottom of the pool is shown placed at an angle so that water and air entering the swimming pool at this angle will provide a fan of bubbles rising in the pool which general pattern is illustrated by dashed lines 22. As can be seen, the aspirator pump 18 and entrance pipe 20 are placed desirably to provide coverage over a substantial portion of the swimming pool whereby a mass of bubbles will be entering the pool over a large surface area. This angular entrance of pipes 20 into the bottom of the pool also desirably agitates the water on the bottom of the pool, thus stirring up silt and trash that may have accumulated on the bottom of the pool into suspension with the water in the pool which will then be filtered out by the filtering system 13 such as through drain 12.

FIG. 2 is taken along line 2—2 of FIG. 1 and shows a cut-away cross section of the pool 10 having a concrete bottom 11, concrete walls 23. The bottom 11 and walls 23 could of course be made of any desirable material and may typically be a gunite structural shell reenforced with steel bars and would typically have an interior finish such as paint or marbelite plaster, or the like. As can be seen in this view, the water line of the pool has an edging of ceramic tile 24 around the edge and the pool is filled with water 25 being maintained at a proper level along the single row of tile 24. Drain 12 with line 14 leading therefrom into pump 13 can be more clearly seen in this view, and it is, of course, to be understood that additional drains will typically be provided in the form of a side skimmer for skimming floating trash off the pool. Water line 15 can be seen passing under the pool to the other side thereof, where cap 16 seals off the other end. Water passing from the pump 13 through the water line 15 pass through a plurality of T-joints 17 having aspirator pumps 18 connected thereto and a connecting line 20 passing from the aspirator pump into the swimming pool 10, bottom 11 at an angle whereby water passing through the line 15 through the aspirator pump 18 and into the swimming pool will draw bubbles of air which pass from the bottom of the pool through the water 25 in the pool into the top of the pool in a generally fan-shape for aerating the water and increasing the oxygen therein while helping to agitate the silt and trash in the pool into suspension with the water for removal by the filter system 13.

It should of course be clear at this point while three aspirator pumps or spray jets have been provided, any number could be used, without departing from the spirit and scope of the present invention, and that while the inlet pipes 20 are placed at angles to provide full coverage of the pool, they could be placed in any desired location in the pool.

Turning now to FIG. 3, a section taken along line 3—3 of FIG. 1 is shown of the pool 10 having side walls 23 and bottom 11, and a drain 12 in the bottom 11 and filled with water 25 to the water level tiles 24. Water line 15 is seen coming from the pump 13 (not shown in this view) and connected to the T-joint 17 and continuing on the other side of the T-joint. An aspirator pump 18 is shown connected to the T-joint 17 with pipe 20 connected from the aspirator pump 18 through the pool bottom 11 into the pool 10 so that water passing through line 15 will pass through aspirator pump 18, through pipe 20 and into the swimming pool water 25. An air line, or air tube 21, is seen connected through the side of the pool and opening 26 which may desirably be located above the water line of the water 25 and between tile pieces 24 so that a small hole may appear in the side of the pool in the grouting between the tiles. Thus air is allowed to pass through the opening 26, through line 21 and into the aspirator 18. A nozzle in the aspirator 18 produces a desirable pressure relationship as the water passes through the aspirator pump to draw the air from the line 21 into the aspirator pump and through pipe line 20 which air will then be bubbled through the water 25 in the pool 10. It can be more clearly seen here that pipe 20 is placed at an angle into swimming pool 10 to provide more coverage of the bubbles leaving pipe 20 and entering the water in the swimming pool.

Figure 4:
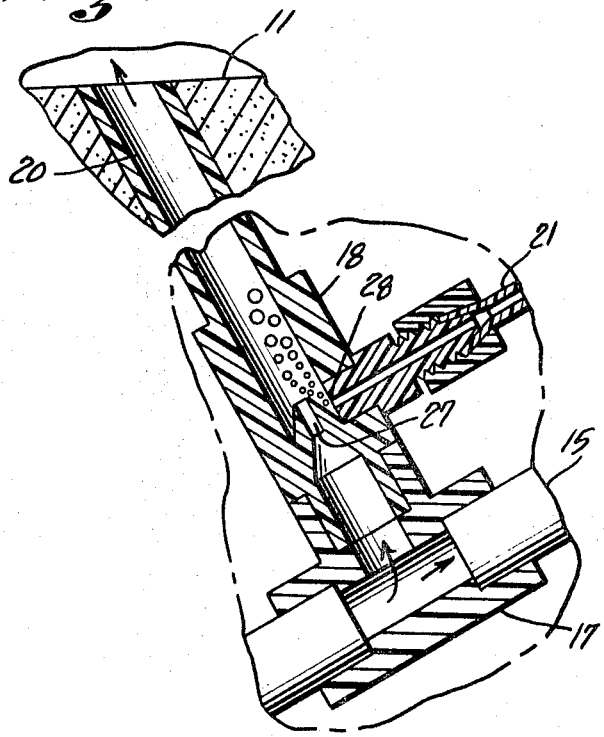
FIG. 4 is a cut-away view of an installed aspirator pump portion of the present invention.

FIG. 4 shows cut-away section of the T-joint 17, aspirator pump 18 and shows a portion of the water pipe 15 and air pipe 21. A portion of the pool bottom 11 can be seen, as can a cut-away portion of the connecting line 20 connecting the aspirator pump 18 to the pool 10 through the pool bottom 11. As can be seen from this view, a nozzle 27 is provided in the aspirator pump 18.

As indicated by the arrows, the water passes through to joint 17 through the nozzle 27 which creates a desirable pressure condition for drawing air from line 21 through an entrance into the aspirator pump 28 and is illustrated as bubbles passing out of the aspirator pump 18 into the pipe 20. By an aspirator pump or device it should be understood that we mean any type such as shown, which utilizes the flow of water to draw a fluid, such as air, into admixture with the water in predetermined proportions, it being understood, of course, that by admixture we mean bubbles of air in the water.

One embodiment of the present invention has been described, but it will of course be clear that other embodiments and equivalents are intended to form a part of the present invention and to be within the spirit and scope thereof. For instance, any desired number of air pumps could be used in the present invention as well as various designs of aspirators, and while it is anticipated that the system will be connected with filtering system and pump, the water being fed through the system could also come directly from a city water line, or the like, and it would not necessarily have to be capped at the other end even though this desirable feature assists in cleaning, by allowing water to pass completely through the water line 15 and drawing water from the pool into line 15 for cleaning out the nozzle 27, and the like, should these become stopped up by trash getting in the water line.

Accordingly, this invention is not to be construed as limited to the particular forms disclosed herein, since these are to be regarded as illustrative rather than restrictive.

I claim:
1. A swimming pool aerator system for bubbling air into a swimming pool, comprising in combination:
    (a) water line means adapted for water to pass through, said water line means being connected to the pressure side of a swimming pool filtering system at one end and being capped at the other end with a removable watertight cap adapted to provide easy access at one end for the removal of clogging materials;
    (b) a plurality of air lines adapted for air to pass through;
    (c) aspirator means having a plurality of aspirator pumps each said aspirator pump being located beneath the floor of said swimming pool and connected in series to said water line means and each said aspirator pump being connected to one said air line for drawing air into water passing through each said aspirator pump;
    (d) each said pool aspirator pump being connected to said pool through the bottom thereof for said water and air to pass from said aspirator pump into said pool whereby bubbles of air will pass through the water in said pool; and
    (e) each said air line having an open end in one wall of said swimming pool above the normal water level for the swimming pool and the other end thereof connected to at least one said aspirator pump.

2. The apparatus according to claim 1 in which each said pool connecting means pipe is located at an angle in the bottom of said swimming pool.

References Cited

UNITED STATES PATENTS

| | | | |
|---|---|---|---|
| 3,045,829 | 7/1962 | Rule et al. | 210—169 |
| 3,192,146 | 6/1965 | Vellas et al. | 210—169 X |
| 3,304,564 | 2/1967 | Green et al. | 210—169 X |

FOREIGN PATENTS

| | | |
|---|---|---|
| 2,709 | 1893 | Great Britain. |
| 9,548 | 1908 | Great Britain. |

REUBEN FRIEDMAN, Primary Examiner

T. A. GRANGER, Assistant Examiner